United States Patent [19]
Kanzler et al.

[11] Patent Number: 5,957,665
[45] Date of Patent: Sep. 28, 1999

[54] JET SYSTEM TOTAL FLUIDS RECOVERY SYSTEM

[75] Inventors: Brian Kanzler, Fuquay-Varina, N.C.;
Michael Dykes, Keystone Heights, Fla.;
Richard Greenley, Yukon, Okla.

[73] Assignee: Reichhold Chemicals Inc., Durham, N.C.

[21] Appl. No.: 08/858,517

[22] Filed: May 19, 1997

[51] Int. Cl.$^6$ .................................................. F04F 5/44
[52] U.S. Cl. ........................ 417/55; 417/151; 417/198; 166/370
[58] Field of Search .................. 166/370; 417/151, 417/55, 198

[56] References Cited

U.S. PATENT DOCUMENTS

| | | | |
|---|---|---|---|
| 2,044,088 | 6/1936 | Lord | 417/151 |
| 3,784,116 | 1/1974 | Buckman et al. | 417/198 |
| 3,980,138 | 9/1976 | Knopik | 417/151 |
| 4,611,950 | 9/1986 | Russomano | 405/128 |
| 4,943,211 | 7/1990 | Boegh | 417/151 |
| 5,098,224 | 3/1992 | Netzel et al. | 405/128 |
| 5,108,600 | 4/1992 | Rees et al. | 210/242.3 |
| 5,173,092 | 12/1992 | Rudder | 55/53 |
| 5,195,587 | 3/1993 | Webb | 166/252 |
| 5,252,226 | 10/1993 | Justice | 210/739 |
| 5,286,140 | 2/1994 | Mather | 405/128 |
| 5,563,066 | 10/1996 | Buchanan | 435/264 |

*Primary Examiner*—Charles G. Freay
*Attorney, Agent, or Firm*—Myers Bigel Sibley & Sajovec

[57] ABSTRACT

A system for removing fluid in a remediation application comprises a supply of pressurized liquid; a supply of contaminated fluid, the contaminated liquid comprising a plurality of components; a jet assembly in fluid communication with the supply of contaminated liquid, the pressurized liquid entering the jet assembly to create a high velocity outlet stream and corresponding vacuum, wherein the vacuum draws contaminated fluid from the supply of contaminated liquid and mixes with the high velocity liquid stream to form a mixed liquid stream; and means for discharging the mixed liquid stream.

24 Claims, 2 Drawing Sheets

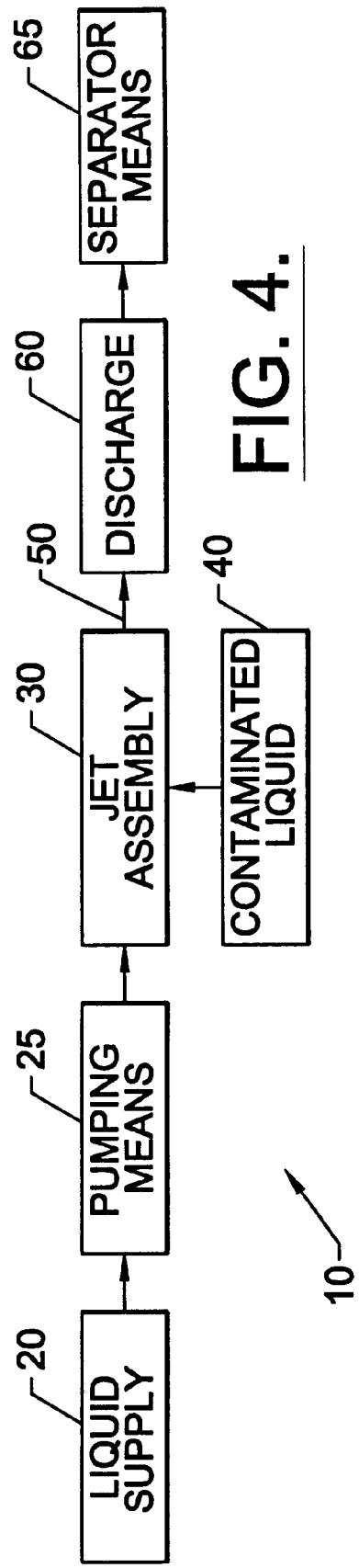

JET SYSTEM TOTAL FLUIDS RECOVERY SYSTEM

FIELD AND BACKGROUND OF THE INVENTION

The invention relates to a system for recovering contaminated fluids which are present in groundwater, soil and related materials.

Contaminants come into contact with groundwater and soil in a variety of ways, such as, for example, manufacturing or mining processes, leakage of piping or process vessels, or other accidental releases. Sizeable releases often occur near the vicinity of a petroleum, chemical, or other manufacturing facilities which has been in operation for an extended period of time, typically over several years. The contaminants typically include a number of liquid, solid, and vapor materials such as hydrocarbons, inorganic and organic chemical wastes, and potentially toxic substances. Aqueous components may also be present. Usually, the contaminants will be trapped in the soil and groundwater through the inherent motion of water and then continue migration. In the event that the contaminants are not contained and/or removed, they potentially could disperse beyond the original contact area and through the groundwater, thus potentially jeopardizing water supplies used for residential and commercial consumption. Surface waters and wetlands may also be threatened by the contaminants.

A number of systems have been proposed for addressing soil contaminant removal. One proposal for addressing the removal of soil contaminants is presented in U.S. Pat. No. 4,611,950 to Russomano. The Russomano patent proposes the removal of contaminants by generally pumping a supply of uncontaminated water through spray nozzles which flood the surface of the contaminated water. The fresh water mixes with the contaminated water, and the mixed water is subsequently passed through a removal conduit system. The above system may employ large amounts of uncontaminated water to operate effectively.

Additionally, a closed-loop system has been developed which is designed to recover contaminated fluid from soil. Specifically, the system utilizes a drive pump in a circulation sump to pass pressurized water through eductors. The eductors are in communication with recovery wells containing contaminated fluid. The contaminated fluid is removed from the recovery wells and is entrained in the pressurized water. The fluids are then transported back to the circulation sump, which is typically present in an above ground tank.

There are potential disadvantages associated with the above systems, especially the circulation system. The circulation system often requires a large above-ground tank to store the collected contaminated fluids. Such a tank is disadvantageous in that it typically demands a sizeable amount of on-site land area. Additionally, the circulation system often requires a complex network of piping which may be susceptible to malfunction. As a result, a potential hazard may occur with the shutdown of the circulation sump, in that large volumes of contaminated fluids may siphon back into the ground.

There remains a need in the art for a system to remove soil contaminants which is generally simpler and more efficient than systems which are currently used.

SUMMARY OF THE INVENTION

It is therefore an object of the present invention to provide a system for removing fluids in groundwater and soil remediation application which is simpler and more efficient than those systems currently used.

The present invention relates to a system for removing contaminated fluid in a remediation application. The contaminated fluid which may be removed by the system of the invention may contain a number of components. The fluid may include liquid, vapor, or mixtures thereof. Typically, the contaminated fluid contains aqueous and non-aqueous components. The non-aqueous components may include, for example, light liquids, heavy liquids, and mixtures thereof.

The system comprises a supply of pressurized liquid, a supply of contaminated liquid comprising a plurality of components, and a jet assembly in fluid communication with the supply of contaminated fluid. In accordance with the invention, the jet assembly allows for the creation of a high velocity liquid stream and subsequent formation of a vacuum. Advantageously, the vacuum draws contaminated fluid from the supply of contaminated fluid such that the fluid mixes with the high velocity liquid stream to form a mixed liquid stream. As a result, the contaminated fluid and the high velocity liquid stream form a mixed liquid stream, and the mixed liquid stream is then discharged through the system.

The supply of pressurized liquid may be provided from a number of sources including, for example, a recovery well, sump, holding tank, or a municipal water supply. The pressurized fluid may be groundwater, fresh water, contaminated water, or mixtures thereof.

BRIEF DESCRIPTION OF THE DRAWINGS

In the drawings which form a portion of the original disclosure as filed:

FIG. 4 illustrates a schematic diagram of a contaminated fluid recovery system in accordance with the invention.

DETAILED DESCRIPTION OF THE INVENTION

The present invention will now be described more fully hereinafter, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

Figure 1:
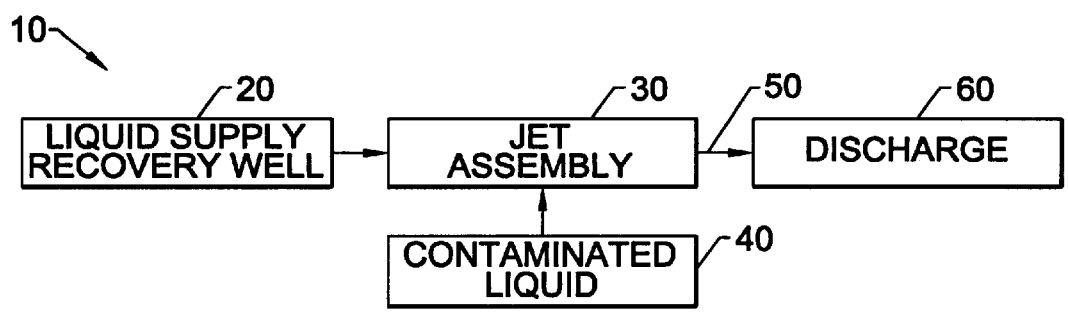
FIG. 1 illustrates a schematic diagram of a contaminated fluid recovery system.

The invention relates to a system for removing fluid in a remediation application, which is illustrated as 10 in FIG. 1. As shown, a supply of pressurized liquid 20 is provided which supplies liquid to jet assembly 30. The pressurized liquid may be interpreted to include a number of various liquids including, but not limited to, groundwater, fresh water, contaminated fluid, and mixtures thereof. The supply of pressurized liquid 20 enters the jet assembly 30 wherein a high velocity outlet stream is created along with a corresponding vacuum. The vacuum draws contaminated fluid from a supply of contaminated fluid 40, and the fluid mixes with the high velocity liquid stream to form a mixed liquid stream 50. Means 60 are also provided for discharging the mixed liquid stream 50. As shown, means 60 are in fluid communication with the jet assembly 30.

Supply 20 may be in the form of any source that supplies pressurized liquid to the system. For example, supply 20 may consist of one or more recovery wells, a sump, a holding tank, cooling water blowdown, wastewater, surface water, or any type of municipal water supply. The pressurized liquid, which exits from supply 20 contains sufficient hydraulic force necessary to recover contaminated fluid in accordance with the invention. Preferably, the pressure of the liquid exiting supply 20 ranges from about 50 psig to about 100 psig, and more preferably from about 60 psig to about 80 psig. It is prefered to have a back pressure on the jet assembly ranging from about 0 psig to about 20 psig. The liquid is typically pressurized by being passed through a conventional pumping system. A commercially-known pumping system is GrundFos sold by Pumps of Oklahoma. The liquid which is pressurized may contain water of varying purities.

The pressurized liquid enters jet assembly 30 and passes therethrough, so as to draw and entrain contaminated fluid from the supply of contaminated fluid 40. The mixed stream of pressurized liquid and contaminated fluid is then transported to discharge means 50.

Figure 2:
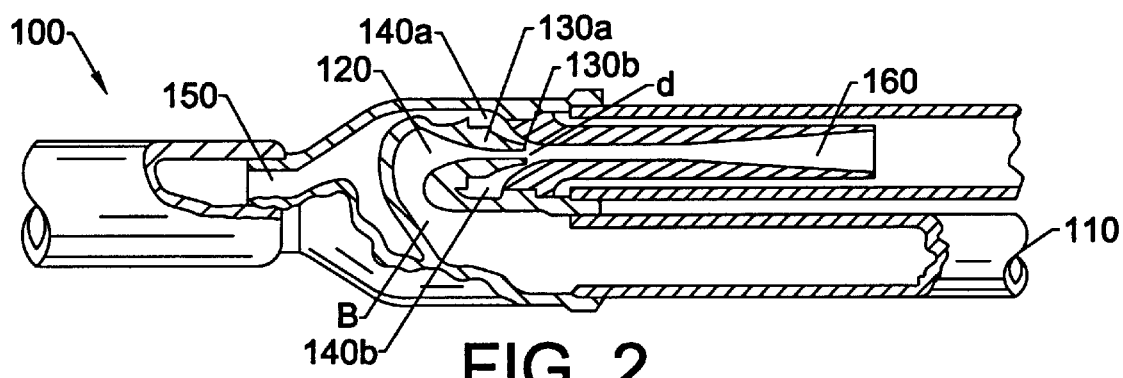
FIG. 2 illustrates an enlarged detailed view of an eductor assembly used in the system of the present invention.

The jet assembly 30 is preferably employed in the form of one or more eductors. The eductor which may be used can be configured in a number of different ways. As shown, and as will be explained further in FIGS. 2 and 3, the eductors each contain nozzles (120 in FIG. 2 and 220 in FIG. 3) which convert a pressurized liquid stream to a high velocity liquid stream, along with inlets to the eductors (110 in FIG. 1 and 210 in FIG. 3) which receive supplies of contaminated fluid. In instances where the contaminated fluid is present in a deep groundwater table, typically greater than about 20 feet deep, it is preferred that the nozzle and the inlet from the contaminated fluid be positioned collinear to each other to allow for installation of the jet assembly 30 down the deep table well or trench. FIG. 2 illustrates an eductor 100 which is employed for this purpose. As shown, the eductor includes an inlet portion 110 which receives pressurized liquid from the supply of pressurized liquid 20. The inlet portion bends within the eductor (depicted by B) and the pressurized liquid enters tube portion 120 having a diameter preferably between about ¾ in and about 1½ in. As shown, the walls 130a and 130b of tube portion 120 taper inward so as to convert the pressurized liquid to a high velocity liquid stream. The diameter of the opening at the end of the tapered walls (denoted by d) preferably ranges from about 1/16 in to about 3/8 in. In this instance, the high velocity liquid stream has a velocity ranging from about 80 ft/sec to about 100 ft/sec.

In FIG. 2, a vacuum is created in chambers 140a and 140b which are present opposite the tapered walls of tube portion 130a and 130b. As a result, contaminated fluid is drawn in through tube 150 which is attached to a suction tube (not shown) connected to the supply of contaminated fluid 40. The contaminated fluid is entrained in the high velocity liquid stream as the fluid/liquid mixture passes through venturi tube 160. The mixed liquid stream then is transported to downstream operations for further processing.

Figure 3:
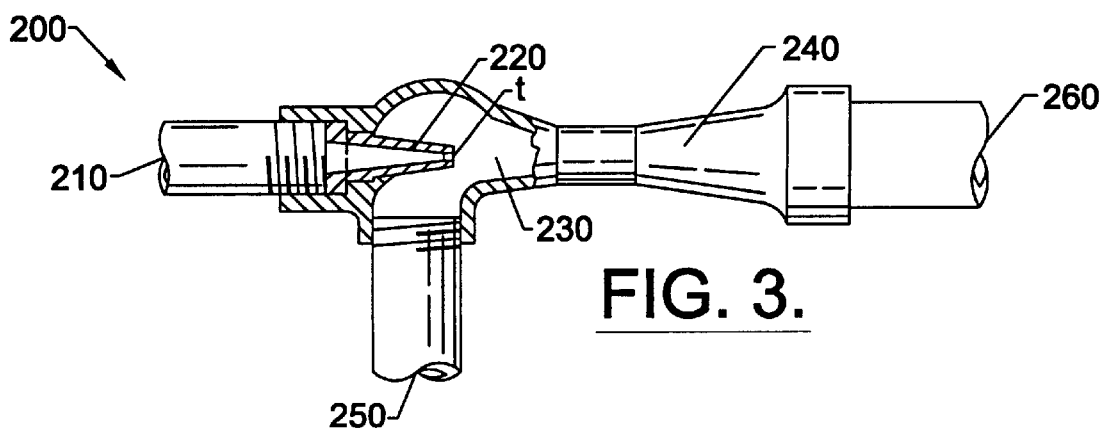
FIG. 3 illustrates an enlarged detailed view of an eductor assembly used in the system of the present invention.

In the event that the contaminated fluid is contained within a shallow groundwater table, i.e., typically less than about 20 feet deep, by virtue of the formation of the high velocity liquid stream, it is preferred that an eductor be used in which the nozzle which converts pressurized liquid stream to a high velocity liquid stream be positioned perpendicular in relation to the inlet of the supply of contaminated fluid. FIG. 3 illustrates such an embodiment denoted as 200. As shown, the pressurized liquid enters the eductor 200 via inlet 210 which has a diameter preferably ranging from about 3/8 in to about 1 in. The pressurized liquid passes through a tapered nozzle 220 so as to create a high velocity liquid stream. Tapered nozzle 220 has a diameter at its tip where the high velocity fluid exits (denoted by t) typically ranging from about 1/16 in to about 3/8 in. In this instance, the high velocity liquid stream typically has a velocity ranging from about 80 ft/s to about 100 ft/s. As the high velocity liquid stream passes through chamber 230, a vacuum is created therein which draws the contaminated fluid through the inlet of suction tube 250 which is in fluid communication with the supply of contaminated fluid (not shown). The vacuum typically ranges from between about 15 in Hg to about 28 in Hg.

The contaminated fluid then becomes entrained in the high velocity liquid stream to form a mixed liquid stream in chamber 230. The mixed liquid stream then passes through venturi tube 240 so as to attain a pressure preferably from about 0 psig to about 10 psig. The mixed liquid stream exits the eductor through outlet 260 and is transported to suitable downstream processing operations.

Various contaminated fluids may be removed according to the system of the present invention. Such contaminants include, but are not limited to, those typically found in soil and related materials. For the purpose of this invention, the term "fluid" is to be broadly construed to include a number of liquid components and vapor components. Such liquid and vapor components include non-aqueous and aqueous-based compounds. Examples of non-aqueous liquids and vapors include, but are not limited to, petroleum hydrocarbons, organic solvents, and contaminant vapors contained in soils above contaminated groundwater. More specifically, the non-aqueous components may include light liquids such as gasoline, diesel fuel, or other immisible fluids having a density of less than that of water; or heavy liquids, such as tetrachloroethene. Mixtures of the above may also be used.

The supply of contaminated fluid 40 may be in the form of any well, trench, or source that typically contains such fluids including, but not limited to, the fluids described hereinabove. Conventional suction tubes are preferably employed to transport the contaminated fluid to the jet assembly 30.

The mixed liquid stream, which includes contaminated fluid entrained in the pressurized stream, exits the jet assembly 30 and is transported via conventional piping to a means for discharging the mixed liquid stream 50. The means 50 for discharging the mixed liquid stream may include various apparatus or stations with a piping system being preferably used.

Although not shown, the system of the invention may also include means for removing the aqueous components from the non-aqueous components which are present in the mixed liquid stream, which is preferably located downstream from the jet assembly 30 and means 50. The means for removing the aqueous from non-aqueous components may typically include any apparatus, device, or system which is suitable in such a separation application.

The following example is to be interpreted as illustrative of the present invention, and is not construed as limiting thereof.

EXAMPLE

A system for recovering contaminated fluids is in operation at Reichhold Chemical, Inc.'s West Plant in Pensacola, Fla. A jet system is driven by discharge water from one recovery well provided at a pumping rate of about 35 gal/min. The discharge water provides adequate pressure (typically greater than about 60 psig) for driving seven eductors located within the jet system. The eductors are employed to recover light non-aqueous phase organic liquid, dissolved contaminants, and contaminated groundwater from ten recovery points comprised of seven temporary well points and three monitor wells.

A pressure drop of about 50 to 60 psig is experienced in the eductors and is sufficient to produce a vacuum of about 30 barometric inches of Hg. Advantageously, the system recovers contaminants at a rate of between about 45 to 55 gal/min or about 64,800 to 79,200 gal/day.

In the specification, drawings, and example, there have been disclosed typical preferred embodiments of the invention and, although specific terms are employed, they are used in a generic and descriptive sense only and not for purposes of limitation of the scope of the invention being set forth in the following claims.

That which is claimed is:

1. A system for removing fluid in a remediation application, said system comprising:
    a supply of pressurized liquid that is present in the form of a recovery well, wherein the pressurized liquid is contaminated, and wherein the liquid is pressurized by virtue of hydraulic force;
    a supply of contaminated fluid, said contaminated fluid comprising a plurality of components one of which is water, and said supply of contaminated fluid being present in the form of a groundwater well;
    a jet assembly in fluid communication with said supply of contaminated fluid, said pressurized liquid entering said jet assembly to create a high velocity liquid stream and corresponding vacuum, wherein the vacuum draws contaminated fluid from said supply of contaminated fluid and mixes with the high velocity liquid stream to form a mixed liquid stream; and
    means for discharging the mixed liquid stream;
    wherein said system is a single-pass system.

2. The system according to claim 1, wherein the contaminated fluid is selected from the group consisting of liquid, vapor, and mixtures thereof.

3. The system according to claim 1, wherein said jet assembly is an eductor comprising a nozzle which converts the pressurized liquid to a high velocity liquid stream, wherein the nozzle is positioned collinear in relation to an inlet in the eductor which receives said supply of contaminated fluid.

4. The system according to claim 1, wherein said jet assembly is an eductor comprising a nozzle which converts the pressurized liquid to a high velocity liquid stream, wherein the nozzle is positioned perpendicular in relation to an inlet in the eductor which receives said supply of contaminated fluid.

5. The system according to claim 1, wherein the contaminated fluid comprises aqueous and non-aqueous components.

6. The system according to claim 5, wherein the non-aqueous components are selected from the group consisting of light liquids, heavy liquids, and mixtures thereof.

7. The system according to claim 1, further comprising at least one suction tube connecting said jet assembly and said supply of contaminated fluid, wherein contaminated fluid flows from said supply of contaminated fluid through said suction tube to said jet assembly.

8. The system according to claim 1, wherein said mixed liquid stream contains aqueous and non-aqueous components, said system further comprising means for removing the non-aqueous components from the aqueous components present in the mixed liquid stream, said means for removing the non-aqueous components positioned downstream from said jet assembly.

9. The system according to claim 8, wherein the non-aqueous components are selected from the group consisting of light liquids, heavy liquids, and mixtures thereof.

10. A method for removing contaminant fluid, said method comprising:
    pressurizing a contaminated liquid stream by virtue of hydraulic force, wherein said contaminated liquid stream is supplied by a recovery well;
    converting the pressurized contaminated liquid stream to a high velocity liquid stream to create a vacuum;
    entraining a supply of contaminated fluid comprising water in the high velocity liquid stream by exposing the contaminated fluid to the vacuum created by the high velocity liquid stream, wherein the contaminated fluid and the high velocity liquid stream form a mixed liquid stream; and
    discharging the mixed liquid stream in a single pass.

11. The method according to claim 10, wherein the contaminated fluid is selected from the group consisting of liquid, vapor, and mixtures thereof.

12. The method according to claim 10, wherein the contaminated fluid comprises aqueous and non-aqueous components.

13. The method according to claim 12, wherein the non-aqueous components are selected from the group consisting of light liquids, heavy liquids, and mixtures thereof.

14. The method according to claim 10, wherein the mixed liquid stream comprises aqueous and non-aqueous components, said method further comprising the step of removing the non-aqueous components from the aqueous components present in the discharged mixed liquid stream.

15. The method according to claim 14, wherein the non-aqueous liquids are selected from the group consisting of light liquids, heavy liquids, and mixtures thereof.

16. The method according to claim 10, wherein the pressurized liquid stream is provided by passing liquid through a pumping system.

17. The method according to claim 10, wherein said step of converting the pressurized liquid stream to a high velocity liquid stream occurs in an eductor which comprises a nozzle which converts the pressurized liquid stream to a high velocity liquid stream, wherein the nozzle is positioned collinear in relation to an inlet in the eductor which receives said supply of contaminated fluid.

18. The method according to claim 10, wherein said step of converting the pressurized liquid stream to a high velocity liquid stream occurs in an eductor which comprises a nozzle which converts the pressurized liquid stream to a high velocity liquid stream, wherein the nozzle is positioned perpendicular in relation to an inlet in the eductor which receives said supply of contaminated fluid.

19. A system for removing fluid in a remediation application, said system comprising:
    a supply of pressurized liquid that is present in the form of a recovery well, wherein the pressurized liquid is contaminated, and wherein the liquid is pressurized by virtue of hydraulic force;
    a plurality of supplies of contaminated fluids, wherein each of said contaminated fluids comprises a plurality of components one of which is water, and said supplies of contaminated fluid being present in the form of groundwater wells;

a plurality of jet assemblies in fluid communication with said plurality of supplies of contaminated fluids, the pressurized liquid entering each of said jet assemblies to create high velocity liquid streams in each of said jet assemblies and corresponding vacuums, wherein each of the vacuums draws contaminated fluids from each of said supplies of contaminated fluids, and wherein each of said plurality of supplies of contaminated fluids mix with corresponding high velocity liquid streams to form a plurality of mixed liquid streams; and means for discharging the mixed liquid streams;

wherein said system is a single-pass system.

20. The system according to claim 19, wherein the contaminated fluids are each selected from the group consisting of liquid, vapor, and mixtures thereof.

21. The system according to claim 19, wherein each of said plurality of jet assemblies is an eductor comprising a nozzle which converts a corresponding pressurized contaminated liquid stream into a high velocity liquid stream, wherein the nozzle is positioned collinear in relation to an inlet in the eductor which receives said supply of contaminated fluid.

22. The system according to claim 19, wherein each of said jet assemblies is an eductor comprising a nozzle which converts the pressurized liquid to a high velocity liquid stream, wherein the nozzle is positioned perpendicular in relation to an inlet in the eductor which receives said supply of contaminated fluid.

23. The system according to claim 19, wherein the contaminated fluids comprise aqueous and non-aqueous components.

24. The system according to claim 23, wherein the non-aqueous components light liquids, heavy liquids, and mixtures thereof.

* * * * *